Feb. 22, 1938. M. VULLIERME 2,108,977
MEANS FOR COOLING AND FILTERING LIQUIDS
Filed March 21, 1936 2 Sheets-Sheet 1

INVENTOR
Marcel Vullierme
BY
ATTORNEYS

Feb. 22, 1938. M. VULLIERME 2,108,977
MEANS FOR COOLING AND FILTERING LIQUIDS
Filed March 21, 1936 2 Sheets-Sheet 2
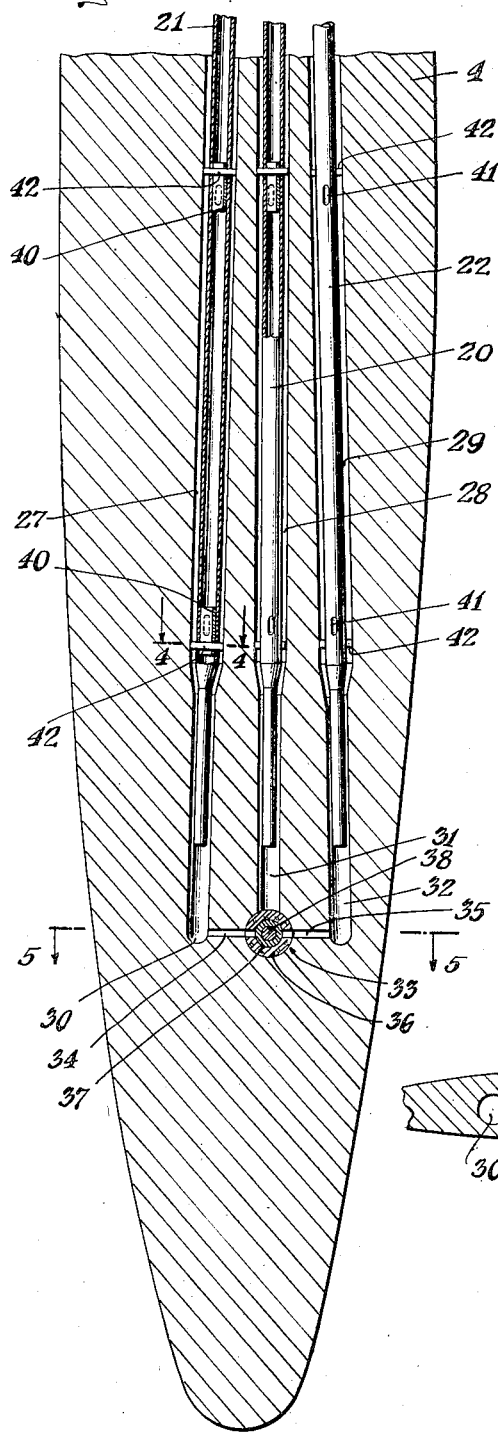
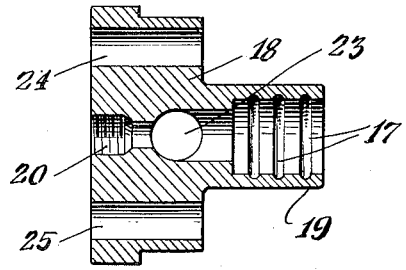
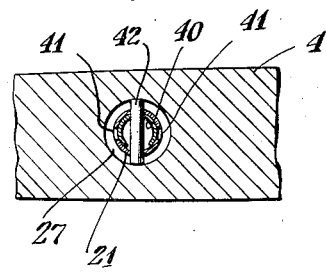
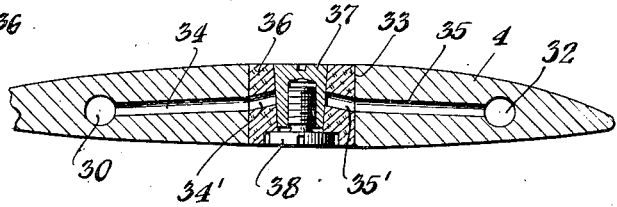
INVENTOR
Marcel Vullierme
BY
Hoguet, Neary & Campbell
ATTORNEYS Patented Feb. 22, 1938

2,108,977

UNITED STATES PATENT OFFICE 2,108,977

MEANS FOR COOLING AND FILTERING LIQUIDS

Marcel Vullierme, Paris, France

Application March 21, 1936, Serial No. 70,115
In Germany March 25, 1935

7 Claims. (Cl. 123—196)

This invention relates to a means of filtration of liquids used in cooling and lubrication systems of engines.

The different fluids employed in engines either for cooling, or for lubrication, acquire in the course of operation various impurities which it is necessary to filter out before putting them again in circulation in the said engines.

Conventional filters of the centrifugal type operate on the principle that bodies suspended in fluids may be separated from the fluid by centrifugal force if the specific gravities of the bodies and the fluid differ. Usually such centrifugal filters are of relatively small size, and must be operated at very high speeds to produce the required centrifugal force for separating the bodies from the fluid. As a result such high speed centrifuges are subject to certain operating disadvantages such as for example, great vibration, and difficulty in preventing destruction of the bearings of the centrifuge.

One object of the invention is to provide an efficient liquid filter, which, while operating centrifugally, need not be operated at a higher rate of speed than the engine.

Another object is to provide such a filter by utilizing the already present moving parts of the engine and so constructing and designing them that they will obtain the additional function of a centrifugal filter.

One important application of the invention to aeronautics is the use of the blade of the propeller of the aircraft as a centrifugal filter. There is thus combined in a single element two distinct functions, namely, the transformation of the energy of the motor for propelling the aircraft, and the filtration of the liquids necessary for the cooling or lubrication of the motor. Moreover, during filtration the liquids are likewise being cooled.

To these ends it is proposed to provide a motor propeller with a liquid circulation system located in the propeller blades and communicating with inlet and outlet conduits for the liquid located in the propeller hub. Then, in the blades at a suitable distance from the hub of the propeller, there may be provided reservoirs where the centrifugally separated impurities are collected. These reservoirs may be closed by means of plugs which are removable so that the interior of the blades and the reservoirs may be cleaned by centrifugal action of the propeller while in rotation.

With the foregoing in mind, the invention comprises the combination of the elements and details of construction described hereinafter in the following specification and appended claims, certain embodiments thereof being illustrated in the accompanying drawings in which:

Figure 2 is a partial view in section of that portion of a propeller which is near the periphery;

Figure 3 is an enlarged detail view in section of an element permitting the passage of the liquid in the propeller blades;

Figure 4 is an enlarged detail view in section of the propeller showing a valve for the automatic regulation of the circulation of the liquid in the propeller;

Figure 5 is a detail view in section of the propeller showing a removable plug therein.

Figure 1:
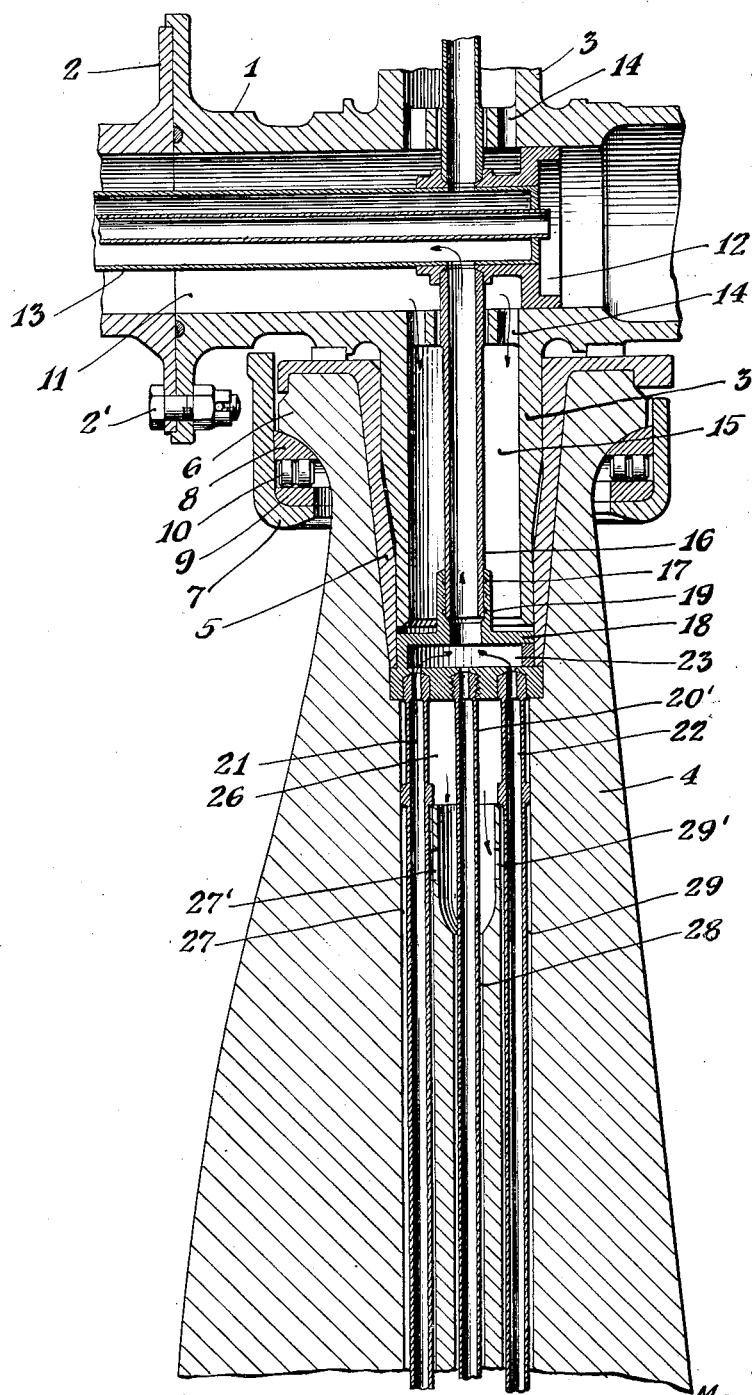
Figure 1 is a partial view in section of that portion of a propeller which is situated near the hub.

Referring more particularly to the drawings, the propeller may be of any known type. The hub 1 of the propeller is mounted by means of bolts 2' upon the plate 2 of a suitable driving shaft. The hub comprises two or more integral extensions 3, according to whether the propeller is provided with two or more blades. These extensions 3 are drilled interiorly. Each of the blades 4 is metallic and preferably of a light alloy and is provided at its foot with a conical retaining band 5 shrunk on and rigidly secured to the blade so as to rotate with the propeller about its axis. The foot 6 of the blade is held tightly against the band 5 and the clamping ring 7, there being provided grooves for bearing races 8 and 9 and the bearing 10.

The liquid to be filtered is introduced through the hollow hub at 11. The extremity of the hub is stopped by the plug 12, which also serves as a support for a tube 13 for returning the filtered liquid to the motor. Communicating passages 14 are provided between the hollow portion 11 of the hub and the chamber 15. At the bottom of chamber 15 is placed a plug 18 which is secured to the blade 4. A tube 16 is mounted in the hub and the plugs 12 and 18 so as to extend through the chamber 15 and serves for the return of the liquid through the tube 13. This tube 16 which turns with the propeller in rotation around the driving shaft but not in the rotation of the blade around its own axis, is held in place in the plug 18 by means of a series of retaining joints 17 to assure a tight fit.

The plug 18 is shown in detail in Figure 3. The tube 16 fits in the tip 19. On the opposite side there is screwed on at 20 the central tube 20' for the circulation of the liquid. Two other tubes 21 and 22 are also supported by the plug 18. There is thus provided a communicating passage between the interior of the tubes 20', 21 and 22 with the chamber 23 and the tube 16 and thence to the tube 13. For the entry of liquid into the blade, holes 24 and 25 are pierced in the plug 18 to permit the passage of the liquid from the chamber 15 into the chamber 26 in the interior of the blade. The liquid reaching this point passes into the passage 28 and through holes 27' and 29' into the passages 27 and 29, hollowed out in the blades before the torsion of the latter, at the desired rate.

As shown in Figure 2, these passages 27, 28 and 29 enclose tubes 21, 20' and 22 respectively for the return of the fluid and extend over a considerable portion of the length of the blade. These tubes open respectively into reservoirs 30, 31 and 32 where the impurities to be separated out accumulate. In practice there are several grams of various impurities, infinitely small, regularly divided without changing the dynamic equilibration of the propeller, each blade receiving in the course of operation an equal quantity of impurities.

At the extremity of the central reservoir 31 there is provided an aperture 33 for cleaning and emptying purposes. In Figure 5, which shows the detail of the aperture 33 in the blade in larger scale, it is seen that the lateral cavities 30 and 32 are connected to the outlet opening by the small conduits 34 and 35. The sleeve 36 shrunk into the aperture 33 has conduits 34' and 35' which communicate with conduits 34 and 35. A conical plug 37 is maintained in place by a screw 38.

Figure 4 shows a regulation valve. If the liquid to be filtered is for example oil, it is necessary to allow for its viscosity when in a cold state. On the interior of the tube 21, placed in the piping 27, there is a cylindrical cleft spring 40. When the pressure of the liquid in the annular piping exceeds a certain limit, the spring bends and allows the liquid to pass through the holes 41, thus short-circuiting the liquid. A small pin 42 holds the spring in place in the tube 40.

It is understood that the invention is not limited to the characteristics shown but that the means and the construction described have to do with the form preferred among the various possible embodiments of the invention.

I claim:

1. In combination with an engine having a liquid circulating system, a propeller driven by said engine and means located within said propeller for allowing circulation of said liquid within said engine and within the blades of said propeller and for centrifuging said liquid by utilizing the centrifugal force set up by the rotation of said propeller when in operation, said means including separate supply and return passages leading from said engine to the hub of said propeller and thence lengthwise of the blades and approximately to the tips thereof and reservoirs located adjacent said tips in communication with said passages for collecting the sediment centrifugally separated from said liquids.

2. In combination with an engine having a liquid circulating system, a propeller driven by said engine and means located within said propeller for allowing circulation of said liquid within said engine and within the blades of said propeller and for centrifuging said liquid by utilizing the centrifugal force set up by the rotation of said propeller when in operation, said means including separate supply and return passages leading from said engine to the hub of said propeller and thence lengthwise of the blades and approximately to the tips thereof and reservoirs located adjacent said tips in communication with said passages for collecting the sediment centrifugally separated from said liquids, said reservoirs being provided with closure members removably fitted in said blades.

3. In combination with an engine having a liquid circulation system, a propeller driven by said engine and conduits carried by said propeller for allowing circulation and centrifuging of said liquid and regulating valves resiliently actuated by pressure of said liquid for controlling and diverting the liquid in said conduits.

4. In combination with an engine having a liquid circulating system, a propeller driven by said engine and means located within said propeller for allowing circulation of said liquid within said engine and within the blades of said propeller and for centrifuging said liquid by utilizing the centrifugal force set up by the rotation of said propeller when in operation and regulating valves resiliently actuated by pressure of said liquid for controlling and diverting the liquid in said passages.

5. In combination with an engine having a liquid circulating system, a propeller driven by said engine and means located within said propeller for allowing circulation of said liquid within said engine and within the blades of said propeller and for centrifuging said liquid by utilizing the centrifugal force set up by the rotation of said propeller when in operation, said means including separate supply and return passages leading from said engine to the hub of said propeller and thence lengthwise of the blades and approximately to the tips thereof and regulating valves in said passages resiliently actuated by pressure of said liquid for controlling and diverting the liquid in said passages.

6. In combination with an engine having a liquid circulating system, a propeller driven by said engine and means located within said propeller for allowing circulation of said liquid within said engine and within the blades of said propeller and for centrifuging said liquid by utilizing the centrifugal force set up by the rotation of said propeller when in operation, said means including separate supply and return passages leading from said engine to the hub of said propeller and thence lengthwise of the blades and approximately to the tips thereof, reservoirs located adjacent said tips in communication with said passages for collecting the sediment centrifugally separated from said liquids and regulating valves resiliently actuated by pressure of said liquid for controlling and diverting the liquid in said passages.

7. In combination with an engine having a liquid circulating system, a propeller driven by said engine and means located within said propeller for allowing circulation of said liquid within said engine and within the blades of said propeller and for centrifuging said liquid by utilizing the centrifugal force set up by the rotation of said propeller when in operation, said means including separate supply and return passages leading from said engine to the hub of said propeller and thence lengthwise of the blades and approximately to the tips thereof and reservoirs located adjacent said tips in communication with said passages for collecting the sediment centrifugally separated from said liquids, said reservoirs being provided with closure members removably fitted in said blades, regulating valves resiliently actuated by pressure of said liquid for controlling and diverting the liquid in said passages.

MARCEL VULLIERME.